June 24, 1941.     M. F. DAVIS     2,246,621
HYDRAULIC BRAKE SAFETY APPLIANCE
Filed July 5, 1940     2 Sheets-Sheet 1

INVENTOR.
MONTA FRANK DAVIS.
BY Miller & Miller
ATTORNEYS.

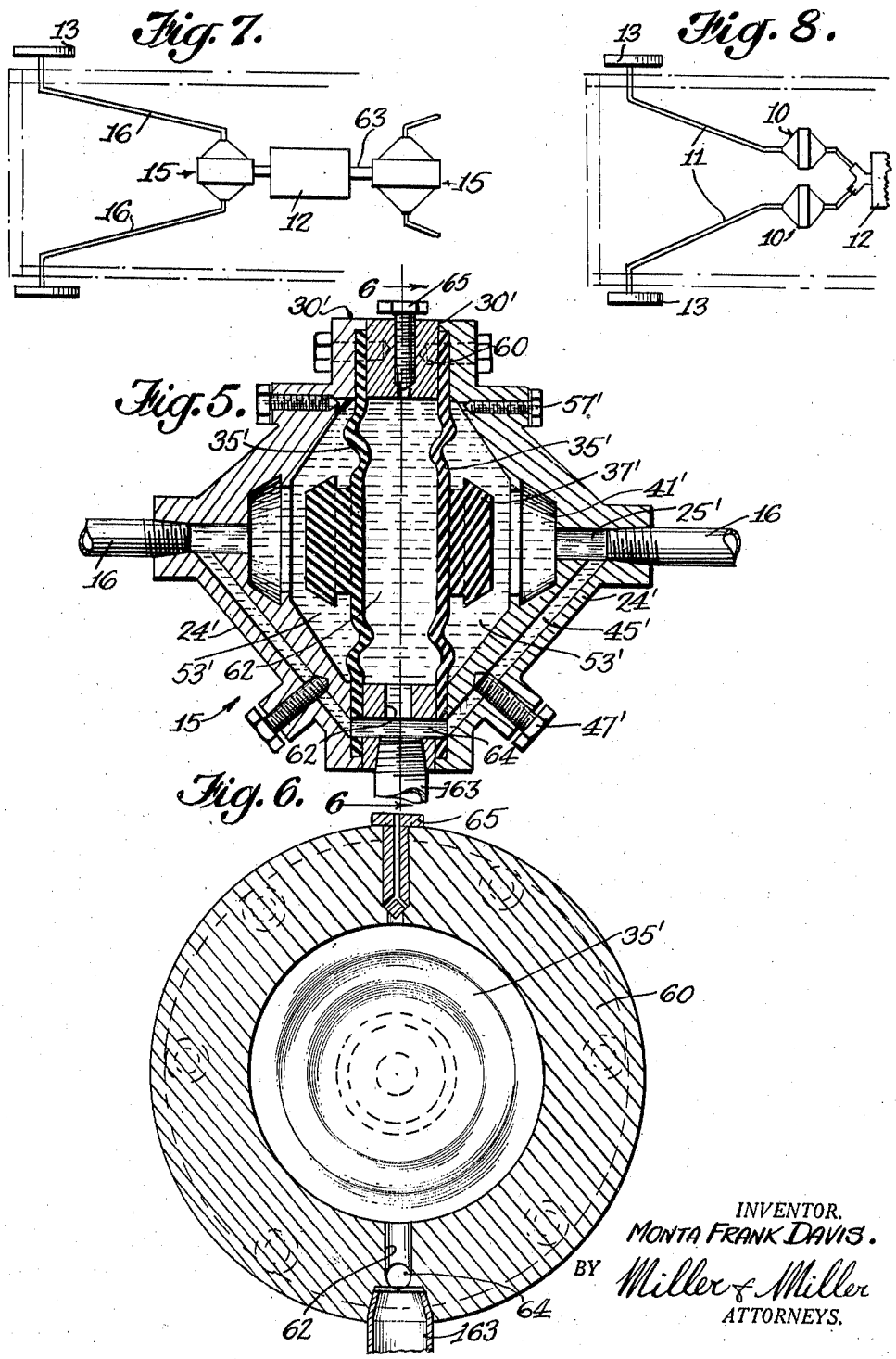

Patented June 24, 1941

2,246,621

UNITED STATES PATENT OFFICE 2,246,621

HYDRAULIC BRAKE SAFETY APPLIANCE

Monta Frank Davis, Amity, Oreg.

Application July 5, 1940, Serial No. 344,108

8 Claims. (Cl. 303—84)

This invention relates to fluid pressure braking systems and more particularly to systems of the type utilizing an expansible fluid medium for effecting actuation of vehicle brakes.

One of the objects of the present invention is to provide a novel fluid pressure braking system of the type utilizing an expansible fluid medium wherein effective operation of the system may be continued notwithstanding the breakage or rupture of one of the fluid pressure conduits.

Another object of the invention is to provide, in a system of the above character, a novel mechanism for preventing loss of the fluid pressure braking medium in the event of a broken fluid pressure conduit.

Still another object is to provide a novel valve device for use in connection with a braking system of the type referred to, and which shall be automatically operable, in the event of a broken fluid pressure conduit, to interrupt communication between the fluid pressure source and such conduit irrespective of continued operation of the brake valve.

A further object is to provide a novel safety arrangement for use in connection with fluid pressure braking systems which, in addition to increasing the reliability of such systems and their capability of braking a vehicle irrespective of a broken conduit, yet conserves the supply of fluid pressure medium, thus enabling efficient operation of the vehicle until the broken conduit may be permanently repaired.

It is common knowledge that with the hydraulic brakes now in use, that if there is a break of any kind in the fluid line, the braking power is entirely gone, both as to front and rear wheels of the vehicle. The purpose of this invention is to prevent this catastrophe and with its use it is impossible for a break in the fluid line or any injury to the braking system short of a complete wreck to affect both sets of wheels at the same time. The invention consists of a bell-shaped casting with a rubber diaphragm in the center against which the brake fluid operates and this diaphragm being corrugated and subject to bellows or accordion-like action moves slightly back and forth with the fluid pressure when the brake is applied.

The appliance is filled with the fluid but instead of the fluid going clear through the bell casting it applies with equal pressure against each side of the rubber diaphragm. If a break occurs in the line, the pressure on the line side of the safety appliance is relieved and the pressure on the other side forces the diaphragm toward the line side and presses a rubber plug integrally extending from the diaphragm to lock into the socket and effectively shut off the escaping fluid. This leaves the fluid pressure intact in the other direction and the brakes on the other set of wheels are in full working effectiveness.

A single unit appliance can be used where desired on trucks or other such vehicles by having one for each wheel, or, of course, it can be used on any vehicle by having two single units, one for the front wheels and one for the rear wheels or a double unit can be used on automobiles or other four wheel motor vehicles and the one double unit will work for both front and rear wheels.

The above and other objects will appear more fully hereinafter from a consideration of the following detailed description in connection with the accompanying drawings, wherein one desirable form of the invention is illustrated. It is to be expressly understood, however, that the drawings are employed for purposes of illustration only and are not to be taken as a definition of the limits of the invention, reference being had for this purpose to the appended claims.

Referring to the drawings, wherein similar reference characters refer to similar parts throughout the several views:

Fig. 5 is a view similar to Fig. 1 of a modified form of this invention.

Fig. 6 is a sectional view on line 6—6 of Fig. 5.

Fig. 7 is a diagrammatic view of the safety appliance of Figs. 5 and 6 in operative assembly, and Fig. 8 is a diagrammatic view of the safety appliance of Figs. 1 to 4, in operative assembly.

Figure 1:
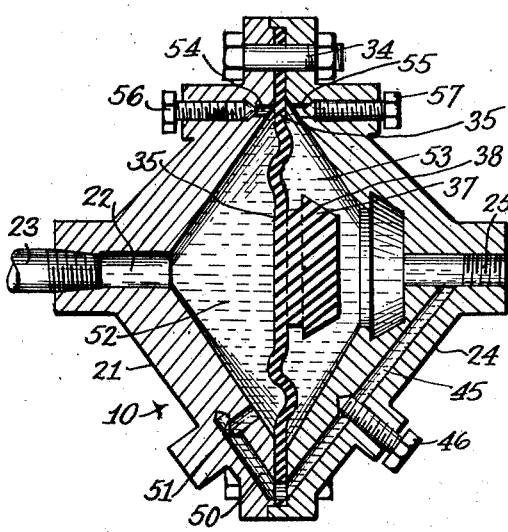
Figure 1 is a sectional elevational view through one form of the safety appliance of this invention.

As shown diagrammatically in Fig. 8, the present invention includes the safety appliance 10 which has been installed in each individual brake line 11 leading from the master cylinder 12 to the braking mechanism of the individual vehicle wheels 13. The safety appliance 10 is of the nature for individual lines, while as shown in Fig. 7, this safety appliance 15 is of the nature that it can have two of the individual brake pressure lines 16 leading from the master cylinder 12 to the braking mechanism of the individual wheels 13. That is, the safety appliance 10 can have but a single pressure line 11 connected thereto while the form of safety appliance shown at 15 is such that it controls two of the individual pressure lines 16. A vehicle may have four of the individual safety appliances 10 connected in its system, or may have two of the double ones shown at 15 and similarly there may be circumstances where it would be desirable to use two of the individual safety appliances 10 and one of the double safety appliances 15 all connected to the same master cylinder 12.

Figure 3:
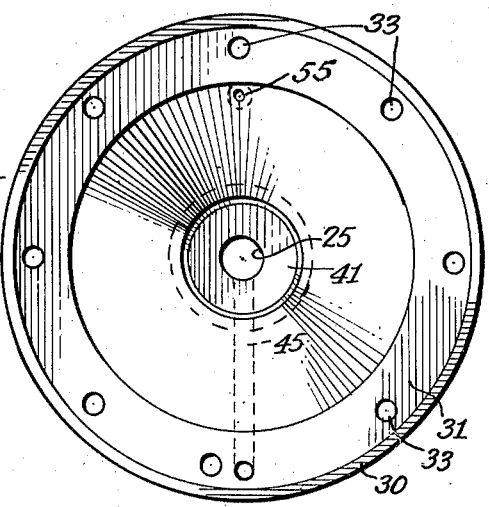
Fig. 3 is a view on line 3—3 of Fig 2.
Figure 2:
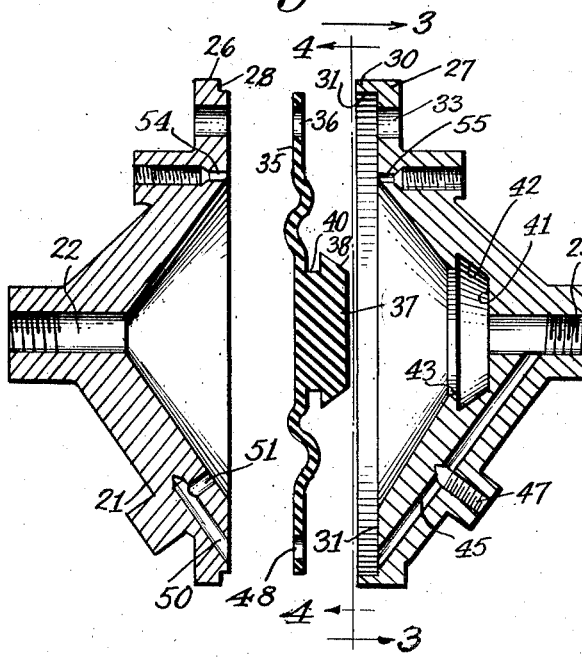
Fig. 2 is an exploded view of Fig. 1.
Figure 4:
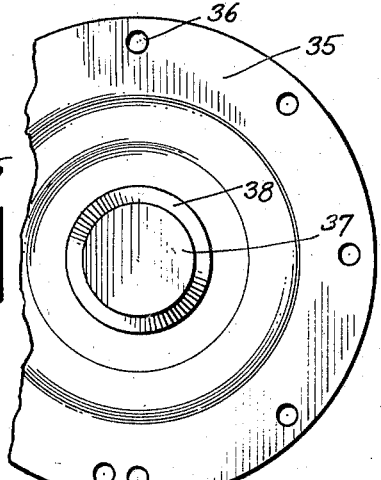
Fig. 4 is a partly broken away view on line 4—4 of Fig. 2.

The detailed construction of the individual safety appliance 10 will now be described. This safety appliance 10 as shown in Figs. 1 to 4 includes a pair of bell castings, the male casting 21 being connected to the master cylinder 12 by an aperture 22 and a conduit line 23, while the female casting 24 is connected by the threaded aperture 25 to the brake pressure line 11. Each of these castings 21 and 24 is provided with mating flanges 26 and 27, the flange 26 of the male casting 21, being rabbeted at 28 so as to receive a projecting edge 30 from the flange 27, yet space the inner face 31 of the female casting 24 from the face 32 of the metal casting 21. A plurality of bolt holes 33 is provided in the flanges 26 and 27 to receive the fastening bolts and nuts therethrough. Likewise secured by these bolts and nuts 34 is a rubber diaphragm 35 whose edges fit in the space provided between the faces 31 and 32 and are also provided with bolt holes 36 so that the same bolts 34 lock the flange 35 between the faces 31 and 32 of the bell casting. This diaphragm 35 is provided at its center with an enlarged plug 37 having a somewhat conical-shaped edge 38 and connected to the diaphragm 35 by a reduced neck 40.

The female casting 24 is provided with a recess 41 corresponding in shape to the plug 37, the recess 41 having a beveled wall 42 and a reduced neck 43 corresponding in size and shape to the conical wall 38 and neck 40 of the plug 37. It will be observed that the recess 41 connects to the aperture 25 to which the pressure line 11 is connected. Also leading to the aperture 25 is a passageway 45 leading to the face 31 while a shut-off plug 46 is threaded as at 47 so that it may completely interrupt this passageway 45. At the face 31 the passageway 45 leads to an aperture 48 in the diaphragm 35 and through this aperture 48 to a passageway 50 connected as at 51 to the chamber 52 between the diaphragm 35 and the aperture 22 leading to the master cylinder.

The diaphragm chamber 52 and the other diaphragm chamber 53 are each provided with bleed apertures 54 and 55 through their respective castings and closed off by bleed plugs 56 and 57.

In operation, the safety appliance 10 is connected between the brake cylinder 12 and the pressure line 11 to the brake mechanism of the individual wheel. Fluid from the brake cylinder 12 flows through the aperture 22 and fills the chamber 52 to force the diaphragm 35 into the chamber 53, thus forcing the fluid in the chamber 53 through the aperture 25 to operate through the pressure line 11 and actuate the brake mechanism in the usual manner. Should the pressure line 11 break, the fluid will escape therethrough and drain out of the chamber 53. This will permit the fluid in chamber 52 to force the diaphragm 35 toward the casing 24, causing the plug 37 to enter into the recess 41 and become locked in position. This will disconnect the particular individual wheel 13 from braking operation, but the fluid in chamber 52 cannot escape, thus allowing the braking mechanism of the remaining wheels to remain in active operation.

With the plug 37 thus locked in position within recess 41, the flexible portion of diaphragm 35 is relieved of unsupported pressure, while the plug 41, being substantially heavier than the flexible portion of the diaphragm 35, is strong enough to stand the pressure exerted thereagainst while the hydraulic brake cylinder is being actuated. Also, with the plug 37 locked within the recess 41, the flexible portion of diaphragm is substantially supported by the conical inner face of casting 24. Without the locking feature of the plug, the diaphragm would continue to flex back and forth as the pressure is applied and released, and with no fluid on the line side thereof, would come into rubbing contact with the conical wall of the casting, tending to wear and break through the diaphragm. With the plug completely absent, the flexible portion of the diaphragm would tend to stretch into the opening 25 under repeated actuation until it finally broke and thus entirely destroyed the safety feature of the device. The presence of the plug and of the locking feature thereof greatly multiplies the safety factor present.

Afterwards, when the vehicle is taken for repairs, the broken fluid line 11 is removed from the aperture 25, a small rod is inserted through the aperture 25 to push the plug 37 out of the recess 41 and release it therefrom and then the fluid line 11 is connected to this aperture 25. The plug 46 is then removed enough to open the passageway 45 connecting the chamber 53 to the chamber 52. The fluid from master cylinder 12 is then pumped through the chamber 52 and through the passageway 51, 50, and 45 to refill the chamber 53 and the pressure line 11, sufficient fluid being added to the master cylinder as may be necessary.

At the same time the bleed plugs 56 and 57 may be released a small amount to allow any air in the chambers 52 and 53 to bleed out. Then with both chambers and the fluid line 11 thus properly refilled, bleed plugs 56 and 57 are closed and the plug 46 is closed to shut off passage 45, thus restoring the system ready for operation again in an emergency if the fluid pressure line 11 should break again.

The form shown in Figs. 5 and 6, at 15, is intended to connect the main cylinder 12 to the two individual brake pressure lines 16. In this form, two castings 24' are used, each casting 24' being identical in every respect and detail with the casting 24 already described. Hence, the same numerals with primes are used to refer to identical parts. Instead of one diaphragm 35, two diaphragms 35', likewise identical, are provided, and a spacing ring 60 is provided to fit between the edges 30' of these castings 24', the diaphragms 35' being held between the faces 31' of the castings 24' and the outer faces of the spacing ring 60. The diaphragms 35' provide a chamber 53' between each diaphragm and its adjacent casting 24', identical in construction and operation with the chamber 53', and each diaphragm 35' has its plug 37' in its chamber 53' which moves when its fluid line 16 breaks, into its recess 41'.

Between the diaphragms 35', there is provided a chamber 62 filled with brake pressure fluid and connected through an opening 162 to a line 63 leading to the master cylinder 12. This opening 162 intersects passageway 64 which connects to passageways 45' leading past the blocking plug 47' to the opening 25'. Similar bleed plugs 57' extend through the castings 24'. In addition, the ring 60 is provided with a bleed plug 65 for bleeding the chamber 62 when necessary in restoring operation. The operation of this form is identical with that of the previous form except that the chamber 62 receives the fluid pressure from the master cylinder 12 and transmits it through both diaphragms 35' to the respective chambers 53' and thus through the brake pressure lines 16.

Should either brake pressure line 16 break, its chamber 53' would empty and its diaphragm plug 37' would enter its recess 47', blocking off that broken brake pressure line 16 to permit the other line 16 to maintain normal operation until repairs can be made, which are made in the same manner as in the single form.

It will thus be seen that the single form of Figs. 1 to 5 is in effect a single brake valve while the double forms of Figs. 5 and 6 is in effect a double brake valve which has a separate and single valve for an individual line.

It will be readily understood from the foregoing description that the present invention provides a novel and effective manner of increasing the braking efficiency and safety of fluid pressure braking systems employing an expansible fluid pressure medium. In systems of this character heretofore utilized, a broken conduit generally rendered the fluid pressure system entirely inoperative by reason of the leakage of pressure medium through the broken conduit. With the present arrangement, however, the broken conduit is sealed immediately upon actuation of the brake valve and thus no loss of pressure medium takes place. On the contrary, full reservoir pressure is available for use with the remaining brake chambers and hence the vehicle may be safely operated until an opportunity is offered for permanently repairing the broken conduit.

While only one form of the invention has been illustrated herein, it is to be understood that various changes and rearrangements of the parts may be resorted to without departing from the spirit of the invention. Reference will, therefore, be had to the appended claims for a definition of the limits of the invention.

Having thus set forth and disclosed this invention, what is claimed is:

1. In a fluid pressure braking system having a main fluid pressure cylinder, and a conduit for each braking mechanism for each individual wheel connecting said master cylinder to the individual braking mechanism; a safety appliance inserted in the individual pressure line adjacent the main cylinder, said safety appliance including a housing, a diaphragm dividing said housing into at least two chambers, one of said chambers opening to the main cylinder, the other of said chambers opening to the individual pressure line, a thickened diaphragm reinforcing plug integral with said diaphragm and extending into the pressure line chamber and a recess in the housing in said pressure line chamber complementary in shape to said plug to receive said plug upon exhaustion of the fluid pressure in said chamber if and when the fluid pressure line empties, said diaphragm thereby preventing the fluid in the chamber to the main cylinder from emptying.

2. In a fluid pressure braking system having a main fluid pressure cylinder, and a conduit for each individual braking mechanism for each individual wheel connecting said main cylinder to the individual braking mechanism; a safety appliance inserted in the individual pressure line adjacent the main cylinder, said safety appliance including a housing, a diaphragm dividing said housing into at least two chambers, one of said chambers opening to the main cylinder, the other of said chambers opening to the individual pressure line, a thickened diaphragm reinforcing integral with said diaphragm and extending into the pressure line chamber and a recess in the housing in said pressure line chamber complementary in shape to said plug to receive said plug upon exhaustion of the fluid pressure in said chamber if and when the fluid pressure line empties, said diaphragm thereby preventing the fluid in the chamber to the main cylinder from emptying, and means for refilling the fluid pressure line and the fluid pressure line chamber comprising a passageway extending within the walls of the chambers and through the diaphragm leading from one chamber to the other chamber and a blocking plug for closing off said passageway.

3. In a fluid pressure braking system having a main fluid pressure cylinder, and a conduit for each individual braking mechanism for each individual wheel connecting said main cylinder to the individual braking mechanism; a safety appliance inserted in the individual pressure line adjacent the main cylinder, said safety appliance including a housing, a diaphragm dividing said housing into at least two chambers, one of said chambers opening to the main cylinder, the other of said chambers opening to the individual pressure line, a thickened diaphragm reinforcing integral with said diaphragm and extending into the pressure line chamber, a conically shaped enlarged head on said plug, a reduced neck connecting the base of said enlarged plug head to said diaphragm, thereby providing a shoulder between said conically shaped head and said reduced neck, and a counterbored recess corresponding in shape and outline to said conically shaped plug head, shoulder and reduced neck and located in the housing in said pressure line chamber to receive said plug upon exhaustion of the fluid pressure in said chamber if and when the fluid pressure line empties, said plug shoulder locking behind said recess counterbore to hold said plug and said diaphragm against movement within the housing, said locked plug thereby preventing the fluid in the chamber to the main cylinder from emptying, and means for refilling the fluid pressure line and the fluid pressure line chamber comprising a passageway leading from one chamber to the other chamber and a blocking plug for closing off said passageway.

4. In a fluid pressure braking system having a main fluid pressure cylinder, and a conduit for each individual braking mechanism for each individual wheel connecting said main cylinder to the individual braking mechanism; a safety appliance inserted in the individual pressure line adjacent the main cylinder, said safety appliance including a housing, a pair of diaphragms dividing said housing into three chambers, one of said chambers being between said diaphragms and connecting to the main fluid pressure cylinder, each of the other chambers individually connecting to one of the fluid pressure lines to an individual wheel braking mechanism, a plug integral with each of said diaphragms and extending into the pressure line chambers, and a recess in the housing in each pressure line chamber to receive the plug upon exhaustion of the fluid pressure in its chamber, if and when one fluid pressure line empties, said diaphragm thereby preventing the fluid in the chamber to the main cylinder from emptying, and leaving the other fluid line and fluid line chamber in operative condition.

5. In a fluid pressure braking system having a main fluid pressure cylinder, and a conduit for each individual braking mechanism for each individual wheel connecting said main cylinder to the individual braking mechanism; a safety appliance inserted in the individual pressure line adjacent the main cylinder, said safety appliance including a housing, a diaphragm dividing said housing into at least two chambers, one of said chambers opening to the main cylinder, the other of said chambers opening to the individual pressure line, and a thickened diaphragm reinforcing plug integral with said diaphragm and so shaped and located on the diaphragm as to extend into the opening to the individual pressure line should the diaphragm extend thereagainst.

6. In a fluid pressure braking system having a main fluid pressure cylinder, and a conduit for each individual braking mechanism for each individual wheel connecting said main cylinder to the individual braking mechanism; a safety appliance inserted in the individual pressure line adjacent the main cylinder, said safety appliance including a housing, a diaphragm dividing said housing into at least two chambers, one of said chambers opening to the main cylinder, the other of said chambers opening to the individual pressure line, and a thickened diaphragm reinforcing plug integral with said diaphragm and so located on the diaphragm as to extend over the opening to the individual pressure line should the diaphragm extend thereagainst, a recess in the housing in said pressure line chamber leading to the pressure line opening therefrom, said plug and recess being of complementary outline whereby said plug will fit snugly within said recess when the pressure line chamber is empty, preventing said diaphragm from flexing, and sealing the pressure line chamber opening.

7. In a fluid pressure braking system safety appliance including a housing, a diaphragm dividing said housing into at least two chambers, one of said chambers having an opening therefrom and liable to be emptied, a thickened diaphragm reinforcing plug integral with said diaphragm and so shaped and located thereon as to extend into said opening should the chamber liable to be emptied become empty.

8. In a fluid pressure braking system safety appliance including a housing, a diaphragm dividing said housing into at least two chambers, one of said chambers having an opening therefrom and liable to be emptied, a thickened diaphragm reinforcing plug integral with said diaphragm and so located thereon as to extend about the opening should the chamber liable to be emptied become empty, a counterbored recess about the opening within the chamber liable to be emptied, said plug being of a shape complementary to said recess adapted to lock therein and seal the opening if and when the last-mentioned chamber becomes empty.

MONTA FRANK DAVIS.